May 25, 1948.  R. S. ELBERTY, JR  2,442,201
HEATING AND COOLING SYSTEM
Filed March 4, 1942  3 Sheets-Sheet 1

Inventor
ROBERT S. ELBERTY JR.
By
Hugh N Roche
Attorney

May 25, 1948.  R. S. ELBERTY, JR  2,442,201
HEATING AND COOLING SYSTEM
Filed March 4, 1942  3 Sheets-Sheet 2

Inventor
ROBERT S. ELBERTY JR.
By
Hugh H. Rocks
Attorney

May 25, 1948.    R. S. ELBERTY, JR    2,442,201
HEATING AND COOLING SYSTEM
Filed March 4, 1942    3 Sheets-Sheet 3
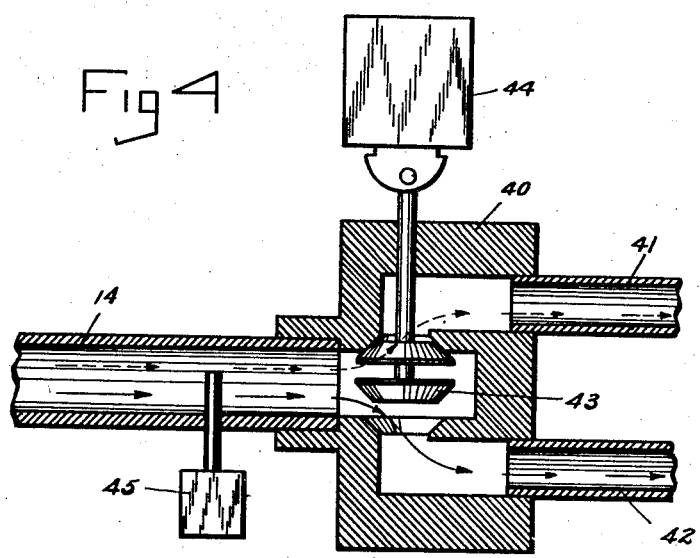
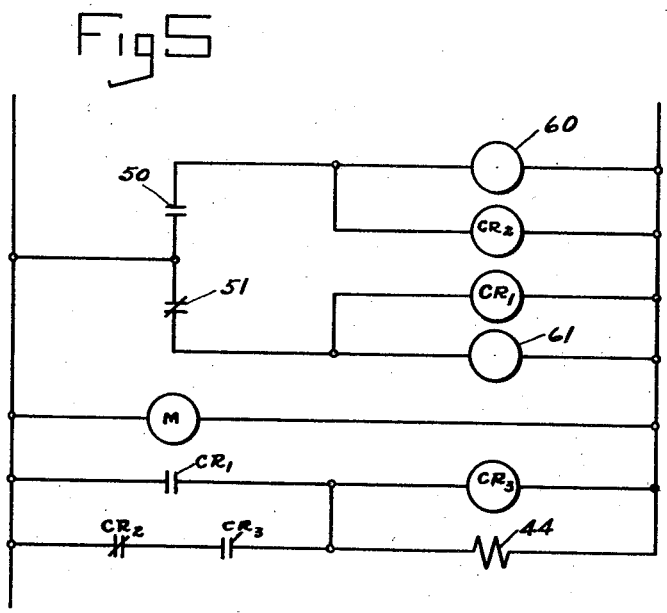
Inventor
ROBERT S. ELBERTY JR.
By
Hugh N. Roche
Attorney Patented May 25, 1948

2,442,201

UNITED STATES PATENT OFFICE 2,442,201

HEATING AND COOLING SYSTEM

Robert S. Elberty, Jr., Waynesboro, Pa.

Application March 4, 1942, Serial No. 433,375

1 Claim. (Cl. 257—3)

This invention relates to heating and cooling systems, particularly those which utilize heat transfer mediums of the panel or radiant type.

Heating or cooling by radiation has been used for air conditioning of buildings, but has not received general approval mainly due to difficulties in automatically controlling this type of comfort control. For example, room thermostats have been used but these devices cause the panel to be hotter than needed in cold weather, and they must therefore be adjusted for lower room temperatures on cold days. There is also an elaborate thermostat which endeavors to measure both radiant and convected heat. Since this unit is large, must be located near the center of the room, and consumes considerable electrical energy, it is too complicated for general use. Also, to regulate the panel to a constant temperature will cause a room to feel cold on cold days, and warm on warm days.

The curve $a$, Figure 1, represents the ideal comfort temperature balance. For practical consideration it has been found that the comfort zone falls on points between curve $b$ on the cold side and curve $c$ on the warm side. For points below curve $b$ people feel cold, and for points above curve $c$ they feel warm.

It will be noted that the mean radiant temperature of the enclosing members of a room has a definite relation to the air temperature if the occupants of the room are to be comfortable. Thus, if the room air temperature is maintained at 70° F., the occupants of the room will feel cold if the mean radiant temperature of the walls, ceilings, and floor should fall below 68° F., and they will feel warm if the mean radiant temperature of the room enclosure rises above 81° F. This is a common fault of air conditioning by merely regulating the temperature of the air in the room. For extremes of outside and wall temperatures, comfort of the occupants of a room is not maintained by such a system. Obviously, maintaining the temperature of a radiant panel at some constant figure is subject to the same defect and will not maintain a comfortable temperature for the people in the room.

Therefore, it is an object of my invention to provide an air conditioning system for buildings wherein the heat transfer to and from the occupants is affected mainly by radiation as compared with the system of raising or lowering the air temperature to affect heat transfer by means of convection.

It is a further object of my invention to provide radiating panels which are heated to produce warmth and cooled to reduce the temperature of objects or people within the room, without greatly affecting the air temperature.

It is a further object of my invention to automatically vary the temperature of the radiating panel in inverse ratio to the temperature of the air in the room.

It is a further object of my invention to increase the temperature of the radiating panels above a predetermined temperature as the temperature of the air falls below a predetermined temperature for heating people in the room, the temperature of the panel to vary in inverse ratio to the air temperature.

It is a further object of my invention to reduce the temperature of the radiating panels below a predetermined temperature as the temperature of the air rises above the comfort zone, for cooling people in the room; the temperature of the panel to vary in inverse ratio to the air temperature.

A further object of my invention is to control the system from temperature in the return line or to maintain a constant temperature in the return line.

A further object of my invention is to proportion the size of the panel and volume of heat transfer medium passing thru said panel.

It is a further object of my invention to provide a simple control which will automatically vary the temperature of the radiant panel in inverse ratio to the room temperature so as to provide a maximum of comfort for the occupants of the room.

Figure 4 is a section of a solenoid operated thermostat controlled valve in the return line of a heating and cooling system.

Figure 5 is a wiring diagram for the control of a heating and cooling system.

Figure 1:
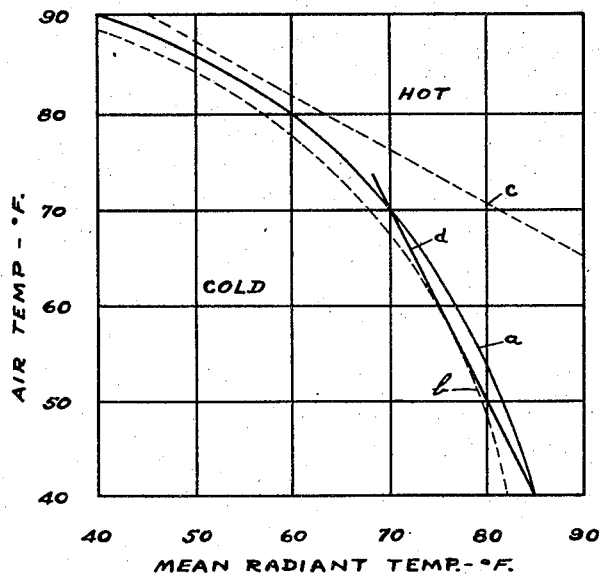
Figure 1 is a curve showing the relative air and mean radiant temperature range in which a comfortable condition may be maintained.

My invention provides a simple and effective method of varying the temperature of a radiant panel in inverse ratio to the room temperature so as to provide a combined mean radiant temperature and air temperature that is comfortable for the occupants of the room and falls within the limits in Figure 1 between curves $b$ and $c$. While the ceiling or walls of a room may be used as radiant panels, the floor is usually the most practical due to the low first cost of installation of the heating and cooling system. In a preferred form of my invention, water pipes are imbedded close to the surface of a floor, wall, or ceiling of a room. In order to have the control respond quickly to changes in temperature water is continuously circulated between these pipes and a heating or cooling system by means of a pump. A thermostat is placed in the water line leaving the radiant panel and this thermostat serves to turn on and off the heating or cooling system. The quantity of circulating water may be regulated by a throttle valve. It is supposed that the room is to be heated in cold weather. If the thermostat in the return water line is set for a predetermined comfortable temperature, say 70° F., and the room temperature is equal to this setting, the water in the return line will be at that temperature and the thermostat will operate to shut down the heating system. As the air temperature falls, the panel will give up some of its heat to the room, the water temperature will fall and the thermostat will turn on the heating system and raise the temperature of the water entering the panel until the temperature of the water leaving the panel reaches the predetermined temperature.

Since heat is being furnished by the panel, the temperature of the water entering the panel is above the thermostat setting, and, therefore, the mean radiant temperature of the panel is also above the thermostat setting. As the air temperature falls, the heat given up by the panel through convection and radiation losses will increase. Since the temperature of the return water line is maintained constant by the thermostat, the temperature of the entering water is further increased by the action of the heating system. By this simple control means, the mean radiant temperature of the panel is therefore increased as the air temperature falls and the accurate balance of radiant and air temperatures is therefore regulated to fall within the limits shown by Figure 1.

In warm weather the water in the panel is circulated through a cooling unit. In this case, the room air heats the water in the panel and the increased temperature of the return line operates the thermostat to turn on the cooling system. The operation is then the same as for heating, and the mean radiant temperature of the panel is reduced as the air in the room becomes warmer to provide a comfortable temperature for the occupants of the room.

Figure 2:
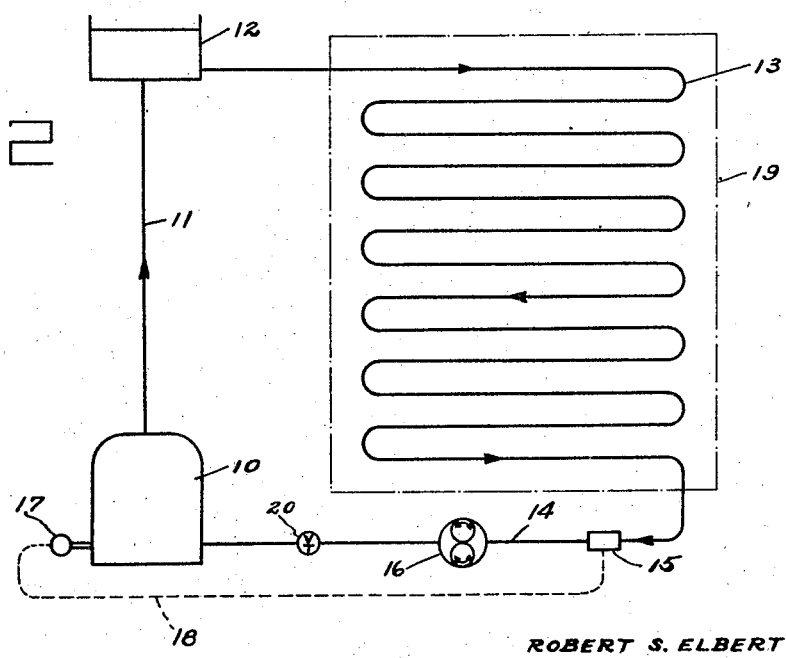
Figure 2 is a schematic diagram of a heating panel and my proposed system of control.

For heating, my apparatus consists of a heating unit 10, Figure 2, which supplies hot water thru line 11 to a supply tank 12. From said tank the hot water flows thru a coil 13 in a wall or floor panel 19 and returns to the heating unit thru line 14 in which are located a thermostat 15 and a continuously operated circulating pump 16. A throttle valve 20 may be used to regulate the amount of circulating water. A fuel supply 17 is controlled from said thermostat through control line 18.

Figure 3:
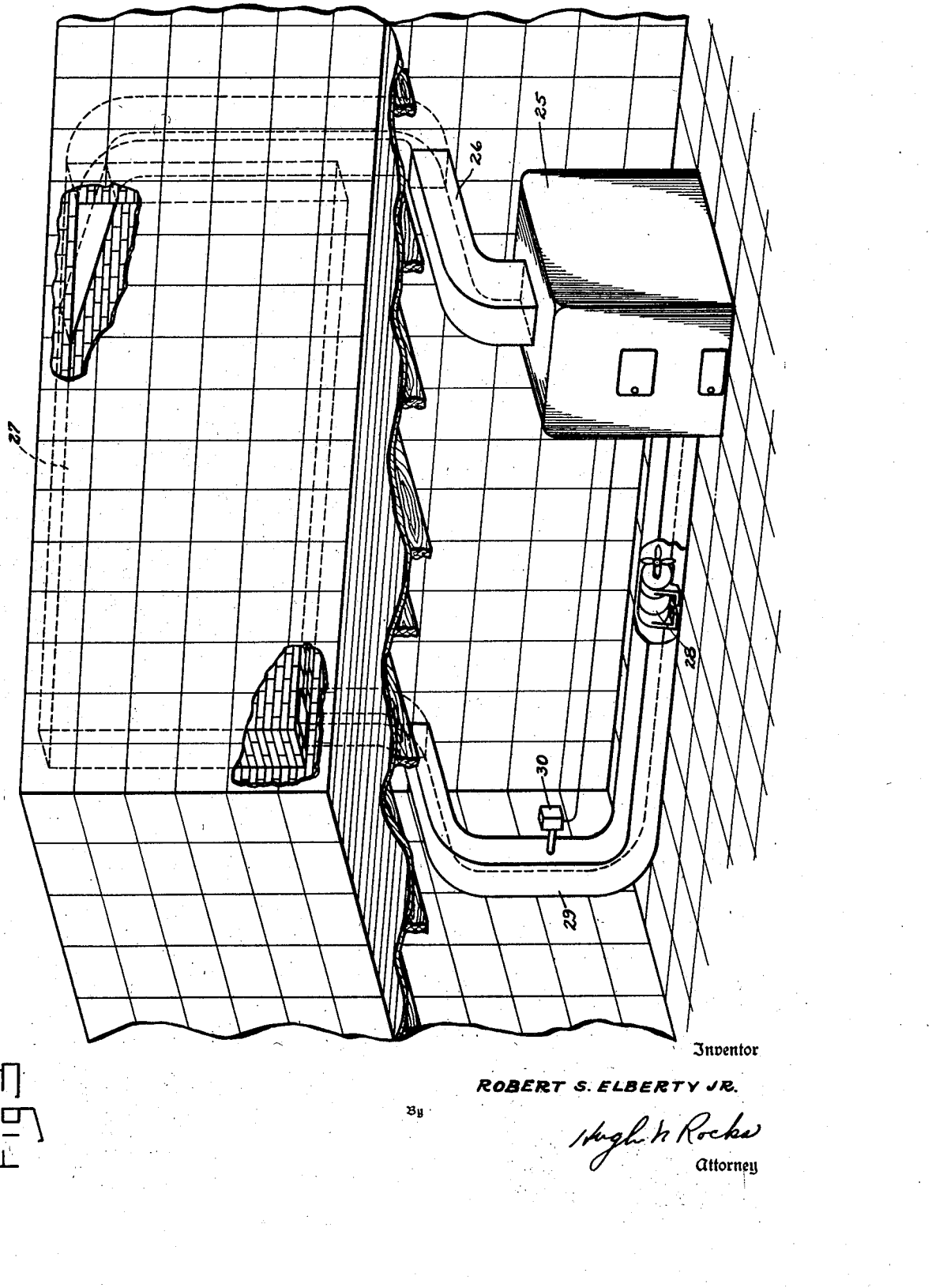
Figure 3 is a broken away section of a house showing a hot air type of panel.

Figure 3 shows an installation using air instead of water as a heat transfer medium. The heat exchange unit 25 may be either a heater, a refrigerator, or both, to circulate air through pipe 26 to a wall panel 27. The flow of air is effected by a continuously operated fan 28 in return line 29. A thermostat 30 in said return line controls operation of said heat exchange unit. In this case, the amount of air circulated may be adjusted by adjusting the speed of fan 28.

In Figure 4 is shown a valve 40 which may be inserted in the return line 14 between the circulating pump and the heater or other heat exchange unit. Said valve has an outlet 41 leading to a cooling unit. Another outlet 42 leads to a heating unit. A valve member 43 may be actuated by a solenoid 44 to direct the heat transfer medium from line 14 to one or the other of said outlets. A thermostat 45 in line 14 actuates said solenoid.

The panel temperature may be varied to approximate curve $a$ in Figure 1 by proportioning the size of the panel 19 to the volume of water supplied to the panel by the circulating pump. A general equation for this proportion may be derived by the following calculation in which—

Let $a$ = area of panel for radiant heating.
$A$ = area of cold wall.
$v$ = amount of circulating water—pounds per hour.
$Th$ = temperature of hot water intake to panel °F.
$Tr$ = temperature of room °F.

For an air temperature of 70°—panel temperature should be 70°. The thermostat set at 70° will get this result. Assume temperature of cold wall = $Tr$. Assume temperature of other walls = mean radiant temperature. Assume mean radiant temperature = average temperature between cold wall and average temperature of heating panel.

These assumptions approximate the ideal condition and have been made to simplify the following calculations. From the approximate conditions obtained, the ideal condition can be reached by adjustment of the thermostat or the pump capacity or by means of a throttle valve.

*Case 1*

For $A=0$, $$MRT = \frac{Th+70}{2} \text{ (assuming mean=average temperature)}$$

For $Tr=40$, $$\frac{Th+70}{2} = 85 \text{ (from chart Figure 1)}$$

$$Th = 100° \text{ F.}$$

Losses from panel =
$$v(100-70) = 30v = \text{(B. t. u. per hour)}$$

$$\text{Losses from panel} = 1.6a\left(\frac{Th+70}{2} - Tr\right) \text{ (Kent)}$$

$$30v = 1.6a(85-40) = 72a$$

$$v = 2.4a$$

*Case 2*

For $A=a$ $$Tr=40, \quad MRT = \frac{\frac{Th+70}{2}+40}{2} = 85$$

$$\frac{Th+70}{2} + 40 = 170$$

$$Th + 70 = 260$$

$$Th = 190$$

$$120v = 1.6a(130-40) = 144a$$

$$v = 1.2a$$

For a general solution $$v = \frac{2.4a^2}{A+a}$$

The effectiveness of this solution may be checked by taking some other room temperature and substituting in the equation From Figure 1

$$Tr = 50°$$

Then $$M.\ R.\ T. = 80°$$

For Case 1

$$(A=0),\ Th=90°$$

$$v = 2.4a$$

$$20 \times 2.4a = 1.6a(80-50)$$

$$48a = 48a \text{ check}$$

For Case 2

$$(A=a)$$

$$80° = \frac{A50° + a\left(\frac{Th+70}{2}\right)}{A+a}$$

$$160° = 50 + \frac{Th+70}{2}$$

$$\begin{array}{r} 320° = 100 + Th + 70 \\ \underline{170\ = 100\qquad\ \ -70} \\ 150° = Th \end{array}$$

$$v = 1.2a$$

$$1.2a \times 80 = 1.6a\ (110-50) = 1.6a\ (60)$$

$$96a = 96a \text{ check}$$

Since the simplified equation for M. R. T. is linear, the temperature control falls along the straight line $d$ which is within the comfort zone for the entire control for room temperature between 70° and 40°.

To convert to air as a heat exchange medium $v$ = amount of water—pounds per hour Specific heat of air = .2430

$$\text{Pounds of air per hour} = \frac{2.4a^2}{(A+a).2430}$$

General solution:

Pounds of heating medium per hour =

$$\frac{2.4a^2}{(A+a)} \times \text{specific heat of heating medium}$$

The term heat exchange unit as used herein refers to a heating or a cooling mechanism or to both.

The term heat transfer medium as used herein refers to water, steam, or air, used to conduct heat or cold thru the system.

By the comfort zone is meant the range of relative temperatures existing between curves $b$ and $c$ in Figure 1.

Operation

In the operation of the apparatus of Figure 2, the hot water from the furnace or heat exchange medium 10 rises thru line 11 to tank 12 from which it passes thru the coil 13 in panel 19. The thermostat 15 in return line 14 is set to maintain a predetermined temperature in said return line. The throttle valve 20 is used to limit the amount of water circulated to a predetermined volume depending upon the area of the panel. When the heat loss from the panel is sufficient to reduce the temperature of the medium in the return line below that for which the thermostat 15 is set, an electric circuit is completed to start the fuel supply unit 17 and additional heat is supplied to the panel to replace that lost so as to maintain the return line temperature substantially constant.

The apparatus of Figure 3 while using air as a heat transfer medium operates in a manner similar to the hot water system of Figure 1. In this case, the thermostat 30 may control a furnace fuel or draft control (not shown).

The valve shown in Figure 4 is specifically for a hot water system but a similar arrangement may be used for hot air. In this unit the medium in line 14 may be directed to a heating or a cooling unit. If the temperature of the medium is higher than desired, thermostat contact 50 (Fig. 5) will be closed and 51 opened, coil $CR_2$ will be energized, solenoid 44 will be deenergized, and valve 43 will open line 41. The cooling control coil 60 will be energized to start the cooling unit and the valve 43 will direct the medium to this cooling unit.

If the return medium temperature is low, the thermostat contact 51 will close and 50 will open, coil $CR_2$ will be deenergized and normally closed contact $CR_2$ closed. Coil $CR_1$ and heater control 61 will be energized and contact $CR_1$ closed to energize coil $CR_3$. Contact $CR_3$ will be closed to complete the circuit through normally closed contact $CR_2$ to energize solenoid 44. Said solenoid will then actuate valve 43 to close the outlet passage 41 to the cooling system and open the outlet passage 42 to the heating system. The valve 40 will remain in this position after contact 51 opens but contact 51 will control the action of the heating system. After contact 51 opens and contact 50 closes, the cooling system will be effective and the valve 40 will remain in the cooling position. In order to keep valve 40 from excessive operation, a ten degree differential is suggested between the operating points of the thermostat where 51 opens and before 50 closes for heating and cooling. For this reason the holding circuit through $CR_2$ and $CR_3$ contacts serves to keep coil $CR_3$ energized after contact $CR_1$ closes, even though $CR_1$ should open later due to the action of thermostat contact 51. Solenoid 44 will not operate each time the heating system is energized, but will be deenergized when the thermostat differential setting has been overcome and contact 50 energizes $CR_2$, thereby opening the normally closed $CR_2$ contact in series with the coil $CR_3$ and solenoid 44. While $CR_1$ will energize the solenoid 44 directly, the action of thermostat contact 51 will be frequent and it is not desirable to operate the solenoid valve every time contact 51 opens. For that reason, the relay $CR_3$ is added. With $CR_2$ deenergized and contact $CR_2$ closed, when $CR_1$ is energized, contact $CR_1$ closing energizes coil $CR_3$ and solenoid 44. Contact $CR_3$ closes to complete a holding circuit through $CR_2$ contact to hold $CR_3$ coil and solenoid 44 energized even though thermostat contact 51 opens. This circuit will continue until thermostat contact 50 closes, energizing coil $CR_2$ and opening contact $CR_2$. In this position contact $CR_1$ will be open so the opening of $CR_2$ will deenergize coil $CR_3$ and solenoid 44. Solenoid 44 will not be reenergized until thermostat contact 51 is closed.

I claim:

A heating and cooling system having means for maintaining a comfortable temperature condition in a room comprising a heat exchange member having heating and cooling parts, a radiant panel, means for circulating a heat transfer fluid continuously between the panel and the heat exchange member, thermostatic means for maintaining a substantially constant temperature in the return line of the circulating medium, and a three way valve controlled by the thermostatic means for directing the circulating medium through heating or cooling parts of the heat exchange unit depending upon the temperature of the circulating medium in said return line.

ROBERT S. ELBERTY, Jr.

REFERENCES CITED

The following references are of record in the file of this patent:

UNITED STATES PATENTS

| Number | Name | Date |
|---|---|---|
| 1,406,852 | Haden et al. | Feb. 14, 1922 |
| 1,718,533 | Crittall et al. | June 25, 1929 |
| 1,827,926 | Ballard | Oct. 20, 1931 |
| 1,918,778 | Persons | July 18, 1933 |
| 1,995,481 | Myers | Mar. 26, 1935 |
| 2,000,539 | Scheide | May 7, 1935 |
| 2,207,979 | Gauger | July 16, 1940 |
| 2,235,692 | Timmis | Mar. 18, 1941 |
| 2,240,951 | Hamjy | May 6, 1941 |
| 2,289,196 | Hutterer | July 7, 1942 |
| 2,318,706 | Newton | May 11, 1943 |

FOREIGN PATENTS

| Number | Country | Date |
|---|---|---|
| 829,601 | France | Apr. 5, 1938 |